United States Patent
Ladouceur

(10) Patent No.: US 7,287,944 B2
(45) Date of Patent: Oct. 30, 2007

(54) SELF-RIVETING MALE FASTENER AND PANEL ASSEMBLY

(75) Inventor: Harold A. Ladouceur, Livonia, MI (US)

(73) Assignee: Whitesell International Corporation, Muscle Shoals, AL (US)

( * ) Notice: Subject to any disclaimer, the term of this patent is extended or adjusted under 35 U.S.C. 154(b) by 0 days.

(21) Appl. No.: 11/335,794

(22) Filed: Jan. 19, 2006

(65) Prior Publication Data
US 2006/0115344 A1    Jun. 1, 2006

Related U.S. Application Data

(63) Continuation of application No. 10/714,265, filed on Nov. 14, 2003, now abandoned.

(51) Int. Cl.
*F16B 39/00* (2006.01)
*B21D 39/03* (2006.01)

(52) U.S. Cl. ............... 411/107; 411/181; 411/176; 29/512

(58) Field of Classification Search ............... 411/107, 411/181, 171–186, 386; 29/432, 432.1, 432.2, 29/512, 793, 243.52; 227/51, 55; 403/242, 403/283
See application file for complete search history.

(56) References Cited

U.S. PATENT DOCUMENTS

| 228,161 | A | | 6/1880 | Adlam, Jr. |
| 521,825 | A | | 6/1894 | Shipe |
| 924,398 | A | * | 6/1909 | Stevens ............... 73/322.5 |
| 1,112,525 | A | | 10/1914 | Darling |
| 1,332,686 | A | | 3/1920 | Reynolds |
| 1,332,687 | A | | 3/1920 | Reynolds |
| 1,705,086 | A | | 3/1929 | Ferguson |
| 1,883,906 | A | | 10/1932 | Hasselquist |
| 1,996,128 | A | | 4/1935 | Morris |
| 2,255,964 | A | | 9/1941 | Blaho |
| 2,269,895 | A | * | 1/1942 | Foster et al. ............. 285/141.1 |
| 2,415,695 | A | | 2/1947 | Cann |
| 2,444,145 | A | | 6/1948 | Rosan |
| 2,707,322 | A | | 5/1955 | Strain et al. |
| 3,014,609 | A | | 12/1961 | Hobbs |
| 3,074,292 | A | | 1/1963 | Polmon |
| 3,079,970 | A | | 3/1963 | Barry |
| 3,125,146 | A | * | 3/1964 | Rosan ..................... 411/180 |
| 3,133,579 | A | * | 5/1964 | Grimm et al. ............. 411/180 |
| 3,204,679 | A | | 9/1965 | Walsh |
| 3,242,962 | A | | 3/1966 | Dupree |
| 3,245,449 | A | * | 4/1966 | Mitchell ..................... 411/176 |
| 3,270,355 | A | * | 9/1966 | Tildesley ..................... 470/20 |

(Continued)

FOREIGN PATENT DOCUMENTS

CA    2327407  A1    10/1999

*Primary Examiner*—Jack W. Lavinder
(74) *Attorney, Agent, or Firm*—Howard & Howard Attorneys, P.C.

(57) ABSTRACT

A male fastener formed of heat treated carbon steel for high performance applications, including a shank portion, radial flange and tubular barrel, wherein the barrel has an axial length of 60% or less than the outside diameter and a fastener and panel assembly, wherein the distal open end of the barrel is deformed into an L-shape and the panel is deformed by the radial flange into an L-shape having an inwardly projecting portion deformed between the radial flange and the outwardly deformed distal end of the barrel.

9 Claims, 4 Drawing Sheets

U.S. PATENT DOCUMENTS

| | | | |
|---|---|---|---|
| 3,381,362 A | 5/1968 | Church et al. | |
| 3,431,960 A * | 3/1969 | Neuschotz | 411/180 |
| 3,461,936 A | 8/1969 | Rosan, Sr. | |
| 3,535,678 A | 10/1970 | Gulistan | |
| 3,770,037 A | 11/1973 | Ernest | |
| 3,782,436 A | 1/1974 | Steiner | |
| 3,820,579 A | 6/1974 | Barry | |
| 3,967,669 A | 7/1976 | Egner | |
| 4,003,286 A * | 1/1977 | Hallock | 411/495 |
| 4,004,483 A * | 1/1977 | Hallock | 411/386 |
| 4,018,257 A | 4/1977 | Jack | |
| 4,193,333 A * | 3/1980 | Hallock | 411/176 |
| 4,430,034 A * | 2/1984 | Fujikawa | 411/179 |
| 4,459,073 A * | 7/1984 | Muller | 411/176 |
| 4,543,023 A | 9/1985 | Capuano | |
| 4,543,701 A * | 10/1985 | Muller | 29/432.1 |
| 4,555,838 A * | 12/1985 | Muller | 29/432.1 |
| 4,610,072 A | 9/1986 | Muller | |
| 4,637,766 A | 1/1987 | Milliser | |
| 4,711,021 A * | 12/1987 | Muller | 29/798 |
| 4,713,872 A * | 12/1987 | Muller | 29/512 |
| 4,779,326 A | 10/1988 | Ichikawa | |
| 4,802,803 A * | 2/1989 | Muller | 411/183 |
| 4,810,143 A | 3/1989 | Muller | |
| 4,825,527 A * | 5/1989 | Ladouceur | 29/432 |
| 4,831,698 A | 5/1989 | Muller | |
| 4,893,976 A | 1/1990 | Milliser et al. | |
| 4,915,558 A * | 4/1990 | Muller | 411/179 |
| 4,940,375 A | 7/1990 | Marvell et al. | |
| 5,020,950 A * | 6/1991 | Ladouceur | 411/107 |
| 5,056,207 A * | 10/1991 | Ladouceur | 29/432.2 |
| 5,092,724 A * | 3/1992 | Muller | 411/179 |
| 5,140,735 A * | 8/1992 | Ladouceur | 29/243.522 |
| 5,207,588 A * | 5/1993 | Ladouceur et al. | 439/84 |
| 5,335,411 A | 8/1994 | Muller et al. | |
| 5,365,654 A * | 11/1994 | Moulton | 29/761 |
| 5,423,645 A | 6/1995 | Muller et al. | |
| 5,439,336 A | 8/1995 | Muller | |
| 5,441,417 A * | 8/1995 | Ladouceur et al. | 439/84 |
| 5,489,176 A * | 2/1996 | Fultz | 411/181 |
| 5,528,812 A * | 6/1996 | Muller | 29/432.2 |
| 5,564,873 A | 10/1996 | Ladouceur et al. | |
| 5,613,815 A * | 3/1997 | Muller | 411/181 |
| 5,644,830 A * | 7/1997 | Ladouceur et al. | 29/432.2 |
| 5,868,535 A * | 2/1999 | Ladouceur | 411/181 |
| 6,108,893 A * | 8/2000 | Wojciechowski et al. | 29/505 |
| 6,122,816 A * | 9/2000 | Ladouceur | 29/509 |
| 6,406,237 B1 | 6/2002 | Wojciechowski et al. | |
| 6,418,609 B1 | 7/2002 | Wojciechowski et al. | |
| 6,491,487 B1 | 12/2002 | Wojciechowski | |
| RE38,061 E | 4/2003 | Ladouceur | |
| 6,644,903 B1 | 11/2003 | Arand | |
| 6,979,160 B2 * | 12/2005 | Babej et al. | 411/179 |
| 7,047,617 B2 * | 5/2006 | Ladouceur | 29/432.1 |
| 2001/0048859 A1 * | 12/2001 | Shinjo | 411/107 |
| 2002/0067975 A1 | 6/2002 | Wojciechowski et al. | |
| 2003/0059272 A1 * | 3/2003 | Petrok et al. | 411/107 |
| 2004/0076489 A1 * | 4/2004 | Ladouceur | 411/181 |
| 2004/0130932 A1 * | 7/2004 | Ladouceur | 365/154 |
| 2005/0025605 A1 * | 2/2005 | Vrana et al. | 411/181 |
| 2005/0158143 A1 | 7/2005 | Ladouceur | |

* cited by examiner

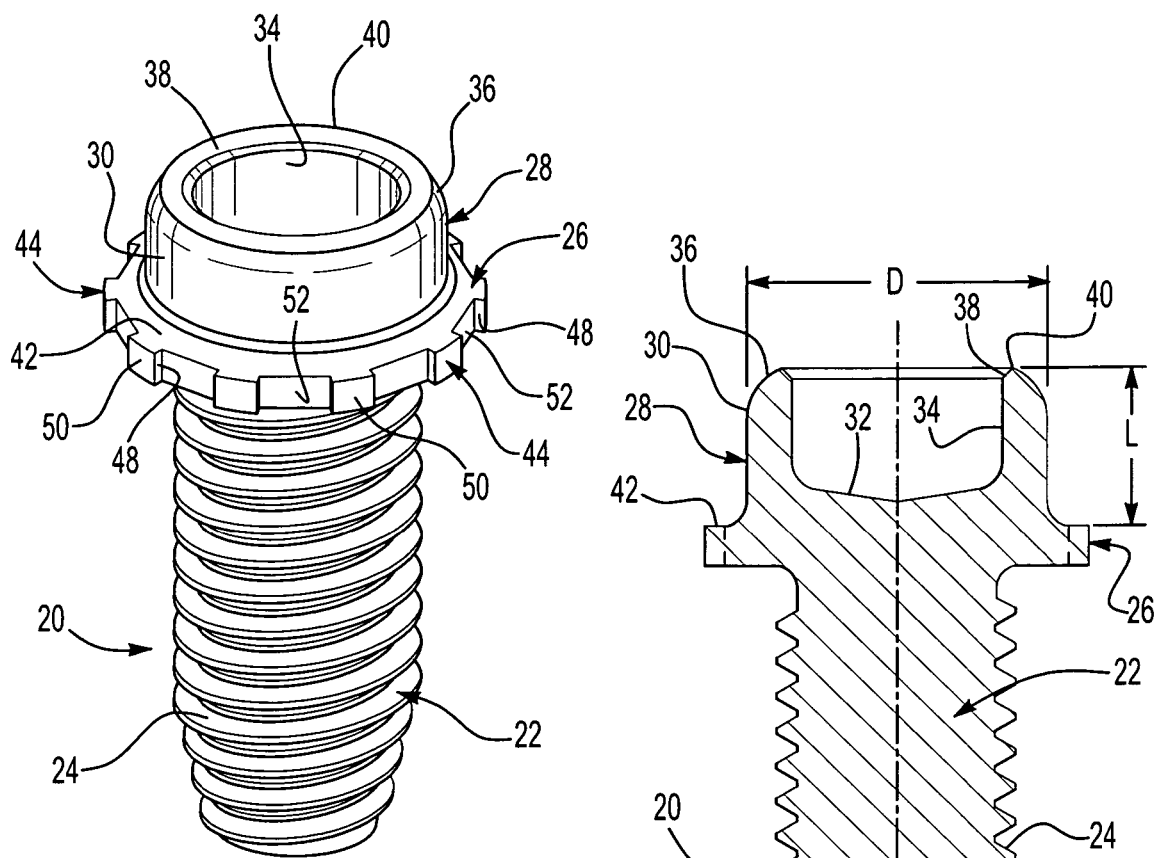
Fig-1
Fig-2
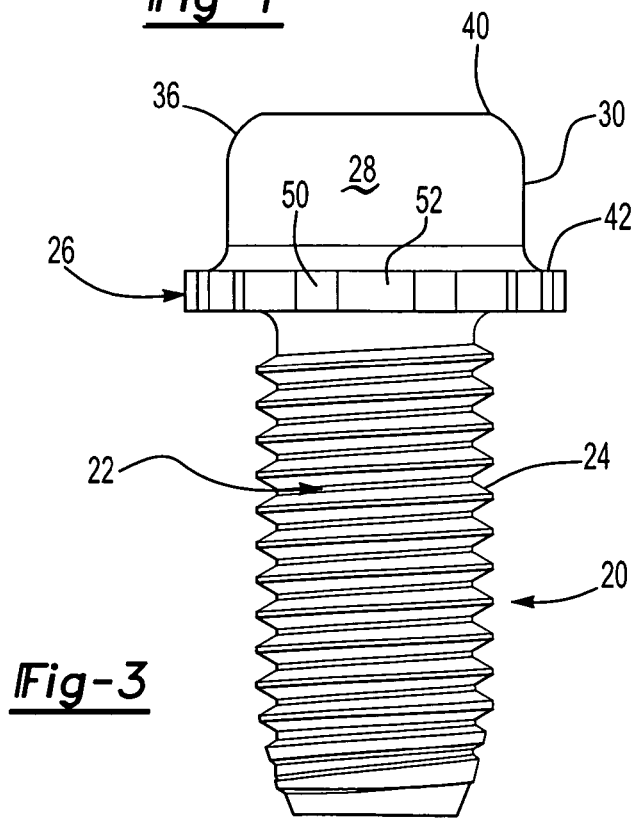
Fig-3

SELF-RIVETING MALE FASTENER AND PANEL ASSEMBLY

RELATED APPLICATION

This application is a continuation application of U.S. patent application Ser. No. 10/714,265 filed Nov. 14, 2003 now abandoned.

FIELD OF THE INVENTION

This invention relates to a self-riveting or self-attaching male fastener and male fastener and panel assembly for high performance applications requiring greater strength and structural integrity, wherein the male fastener, such as a stud or bolt, includes an integral tubular barrel portion which is received through an opening in the panel and riveted to the panel.

BACKGROUND OF THE INVENTION

U.S. Pat. No. 4,459,073 assigned to the assignee of the predecessor in interest of this application discloses an early embodiment of a self-piercing and riveting fastener of the general type disclosed herein and method of installing the male fastener in a panel. As shown in this patent, the male fastener includes a threaded shank portion, a radial flange portion integral with the shank portion and a tubular barrel portion integral with the flange portion and coaxially aligned with the shank portion. The male fastener is installed in a panel by supporting the panel on a die member or "die button" and driving the distal end of the barrel portion against the panel, piercing a slug from the panel and the deforming the distal end of the tubular barrel portion radially outwardly and deforming the panel surrounding the pierced panel opening between the radial flange portion and the L-shape barrel portion. This embodiment of the self-piercing male fastener and method of installation in a panel was not commercially successful because the fastener and panel assembly had insufficient integrity, including pull-out strength and no means was provided to prevent rotation of the stud in the panel. U.S. Pat. Nos. 4,915,558 and 5,092,724, also assigned to the assignee of the predecessor in interest of the assignee of this application, discloses a commercially successful self-piercing male fastener and method of installation, wherein the fastener includes a shank portion, a radial flange portion and a tubular barrel portion as described above; however, the tubular barrel portion has an axial length generally equal to the outer diameter of the barrel portion and the male fastener is installed in a die member having a concave die surface, including a frustoconical opening and a concave annular bottom surface joining the frustoconical surface by an annular radial lip. The distal end of the tubular barrel portion is driven against a panel supported on the die member, which pierces a slug from the panel, and the distal end portion of the tubular barrel portion is deformed in the concave annular guide surface into a U-shape, wherein the panel surrounding the pierce panel opening is driven inwardly by the annular radial lip of the die member into the U-shaped barrel portion, tightly packing the panel between the radial flange portion and the U-shaped barrel portion. Although this male fastener and method of installation has been commercially successful, the male fastener and method of assembly is not suitable for high performance applications, such as automotive seat belt retaining studs, wherein the male fastener element must be formed of a high strength steel, or in applications having a panel thickness of greater than about 2 mm. It has been found that the barrel portion will crack when deformed into a U-shape as disclosed in U.S. Pat. No. 4,915,558, resulting in poor male fastener and panel assembly integrity.

High performance applications of this type of fastener also requires improved torque resistance. U.S. Pat. No. 6,122,816, assigned to the assignee of this application, discloses a male fastening element of the type disclosed herein, wherein the outer surface of the barrel portion is frustoconical and the radial flange portion includes an outer surface having a plurality of circumferentially arcuate radially inwardly concave surfaces, improving torque resistance when installed in a panel. In the method of installation disclosed in this patent, the radial flange portion is driven into the panel and the panel is then deformed into the arcuate radially inwardly concave surfaces providing torque resistance. Reference is also made to copending U.S. application Ser. No. 10/271,480 filed Oct. 16, 2002, assigned to the assignee of this application, which discloses a male fastening element of the type disclosed herein, wherein the outer surface of the radial flange portion includes a plurality of circumferiantially spaced radially projections or teeth which are driven into the panel during installation and provide greater torque resistance.

However, there remains a need for a self-riveting male fastener or stud of the type described above specifically for high performance applications, wherein the stud is formed of a high strength steel suitable for such applications. The self-riveting male fastener and method of installation of this invention is particularly suitable for high performance applications, wherein the stud is formed of a high strength steel which avoids cracking of the barrel during installation and may be installed in thicker metal panels as required for safety related applications.

SUMMARY OF THE INVENTION

The self-attaching or self-riveting male fastener of this invention is formed of a high strength carbon steel for high performance applications, such as seat retaining studs and other safety related applications, including seat belt retainers, passive restraints and the like. In the preferred embodiments, the self-riveting male fastener is formed of a high strength steel, such as 1038 carbon steel and heat treated to a hardness of at least 30 Rockwell on the C scale or Rockwell C. In a typical application, the stud will meet Class 10.9, which has a hardness of 32 to 39 Rockwell C. The male fastener may be a stud or bolt fastener, wherein the shank portion may be threaded or unthreaded depending upon the application. One embodiment of the male fastener element of this invention includes a radial flange portion integral with the shank portion and a tubular barrel portion integral with the radial flange portion and coaxially aligned with the shank portion having an open distal end as described above. However, the barrel portion of the male fastener of this invention has an axial length equal to or less than 60% of the outer diameter of the tubular barrel portion. In a preferred embodiment, the tubular barrel portion has a smooth cylindrical outer surface and a smooth cylindrical inner surface, such that the barrel portion has a substantially constant internal and external diameter, except that the internal surface includes a chamfer and the outer surface is arcuate adjacent the distal end of the tubular barrel portion, as is known by those skilled in this art for this type of fastener.

Many high performance applications also require significant torque resistance. That is, the male fastener must be prevented from rotating in the panel following installation.

Although various antirotation means may be utilized, in the disclosed embodiment the outer surface of the radial flanged portion includes a plurality of radially extending circumferentially spaced radial projections or teeth each having a cylindrical outer surface and a planar surface extending generally perpendicular to the circumference of the outer surface of the radial flange portion. Depending upon the application of the of the male fastener element, the male fastener element provides torque resistance to turning in either direction. For example, the shank portion may be threaded and a nut may be torqued on to the threaded shank portion, requiring torque resistance in the direction of rotation of the nut as the nut is threaded or cross-threaded onto the shank portion. However, the nut may also be unthreaded from the shank for repair or maintenance, requiring torque resistance in the opposite direction. Thus, in the disclosed embodiment, each of the circumferentially spaced radially teeth include planar surfaces on both sides of the radial projections.

The male fastener element is installed in a panel by piercing or pre-forming an opening in the panel having a diameter generally equal to the outer diameter of the tubular barrel portion and supporting the panel on a die member or "die button" in a die press, generally the lower die platen as will be understood by those skilled in this art. However, because the barrel portion of the male fastener is shorter than a conventional male fastener of this type, the die opening is relatively shallow compared to a conventional die button for this type of installation. The die button preferably includes a concave annular surface which extends to the panel support surface and a central planar nose portion. The male fastener may be received in a conventional installation head attached to the upper die shoe of the die press which aligns the tubular barrel portion with the opening through the panel and the opening through the panel is coaxially aligned with the central nose portion. The installation head includes a reciprocating plunger which engages an annular surface of the radial flange portion and drives the male fastener toward the panel upon closing of the die press. The distal open end of the barrel portion is then driven by the plunger through the panel opening into the concave annular die surface of the die button, deforming the panel radially outwardly and the radial flange portion is driven into the panel forming an L-shaped panel portion surrounding the panel opening including a portion extending perpendicular to the planar panel having an internal surface which is deformed against the outer surface of the radial flange portion and a generally radially inwardly extending portion which is deformed between the radially outwardly extending distal end portion of the barrel portion, securely retaining the male fastener element in the panel. Where the outer surface of the radial flange portion includes circumferentially spaced radial teeth, as described above, the panel is deformed between the teeth, providing excellent torque resistance.

The male fastener and panel assembly of this invention thus includes a male fastener preferably formed of a high strength steel as described, including a shank portion, a radial flange portion integral with the shank portion having a diameter greater than the shank portion and a tubular barrel portion coaxially aligned with the shank portion having a tubular portion integral with the flange portion and a generally radially outwardly extending distal end portion spaced from the flange portion, generally perpendicular to the tubular portion. The metal panel includes a planar portion surrounding the outer surface of the flange portion and an L-shaped portion including a portion extending perpendicular to the planar portion having an inner surface deformed against the outer surface of the radial flange portion preferably in substantially face to face contact therewith and a radially inwardly directed portion deformed between the radial flange portion and the generally radially outwardly extending distal end portion of the barrel portion. Where the outer surface of the radial flange portion includes a plurality of circumferentially spaced radial teeth as described above, the inner surface of the L-shaped panel portion is deformed radially inwardly between the teeth substantially filling the space between the teeth and provided improved toward resistance. In fact, testing has established that the shank portion will break before rotation of the stud relative to the panel.

In the disclosed embodiment, the radially inwardly extending panel portion received between the generally radially outwardly extending distal end portion of the barrel portion and the flange portion is generally rectangular in shape having a width equal to about one half the width of the planar panel portions surrounding the radial flange portion. The inner surface of the tubular barrel portion formed by the concave annular die surface is arcuate and smoothly blends with the L-shaped panel portion providing a smooth continuous arcuate surface extending from the bottom surface of the radial flange portion to the outer distal end of the generally radially outwardly extending distal end portion of the barrel portion.

As set forth above, the self-riveting male fastener of this invention is formed of a high strength carbon steel, preferably having a hardness of greater than 30 Rockwell C or between 30 and 40 Rockwell C, for high performance applications, including safety related applications. However, where the barrel portion of the male fastener element has an axial length greater than about 60% of the outer diameter of the outside diameter of the barrel portion and the barrel portion is deformed into a U-shape as shown in the above referenced U.S. Pat. No. 5,092,724, the barrel portion will crack when formed of a high strength carbon steel having a hardness greater than 30 Rockwell C. In the preferred embodiment, the axial length of the barrel portion is about 55% of the outside diameter, whereas the axial length of the male fastener disclosed in the above referenced U.S. Pat. No. 5,092,724 is about 80% of the outside diameter or greater.

Other advantages and meritorious features of the male fastener and male fastener and panel assembly of this invention will be more fully understood from the following description of the preferred embodiments, the appended claims and the drawings, a brief description of which follows.

BRIEF DESCRIPTION OF THE DRAWINGS

FIG. 1 is an elevated side view of one embodiment of the self-riveting male fastener of this disclosure;

FIG. 2 is a side cross-sectional view of the male fastener shown in FIG. 1;

FIG. 3 is a side view of the male fastener shown in FIGS. 1 and 2;

DESCRIPTION OF THE PREFERRED EMBODIMENTS

Figure 4:
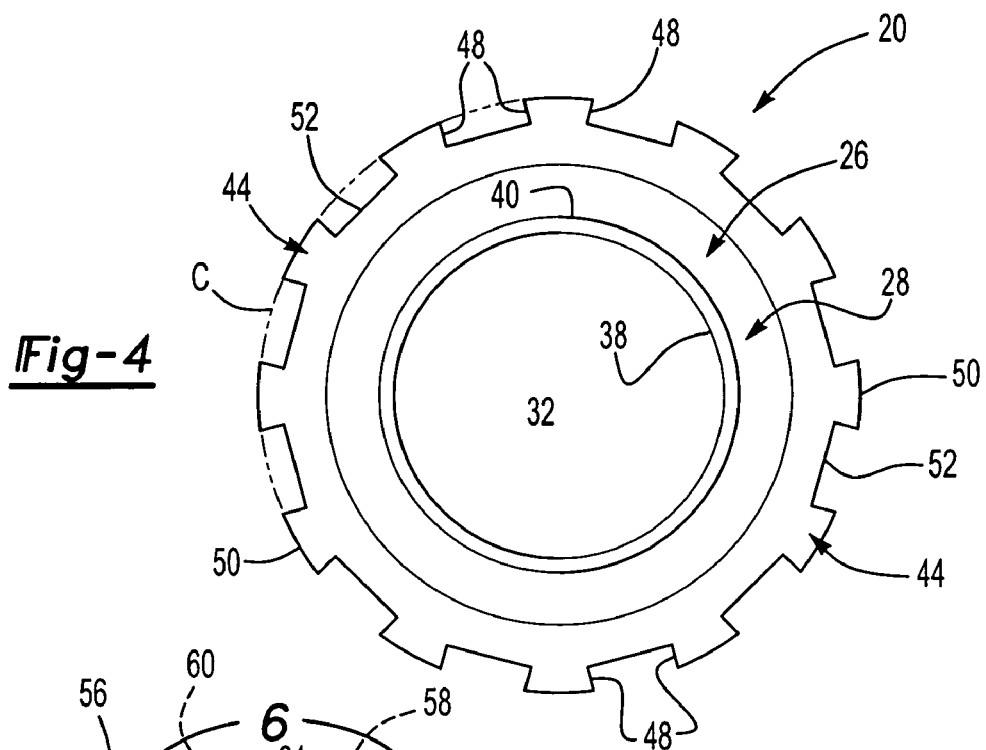
FIG. 4 is an end view of the male fastener shown in FIGS. 1 to 3.

As will be understood by those skilled in this art and discussed further below, the drawings illustrate only one preferred embodiment of the self-riveting male fastener and male fastener and panel assembly of this invention for illustrative purposes only. The embodiment of the self-riveting male fastener 20 illustrated in FIGS. 1-4 includes a shank portion 22, which may be externally threaded as shown at 24, a radial flange portion 26 integral with the shank portion 22 having a diameter greater than the shank portion 22 and a tubular barrel portion 28 integral with the radial flange portion 26. As shown in FIG. 2, the tubular barrel portion 28 is coaxially aligned with the radial flange portion 26 and the shank portion 22 relative to the longitudinal axis "A" of the self-riveting male fastener 20.

The tubular barrel portion 28 preferably has a cylindrical outer surface 30, a bottom wall 32 and a cylindrical inner surface 34, such that the tubular barrel portion has a substantially constant cross-sectional area beginning with the bottom wall 32 to adjacent the distal open end 40. In the disclosed embodiment, the distal end 40 of the barrel portion 28 includes an arcuate outer surface 36 and a chamfered inner surface 38. The tubular barrel portion has an axial length "L" measured from the annular surface 42 of the radial flange portion 26 adjacent the tubular barrel portion 28 and an outer diameter "D" of the cylindrical outer surface 30. As set forth above, the dimensional relation between the length "L" and the outer diameter "D" of the tubular barrel portion 28 is critical to avoid cracking of the barrel portion during installation in a panel in high performance applications where the fastener element 20 is formed of a high strength hardened carbon steel as required for such applications. In a preferred embodiment, the axial length "L" of the tubular barrel is less than 60% of the outer diameter "D" or more preferably about 55%. The self-riveting male fastener 20 is preferably formed of a high strength carbon steel having a hardness greater than 30 Rockwell C as discussed further below.

In such high performance applications, it is also desirable to provide antirotation means or sufficient torque resistance to prevent rotation of the fastener element 20 relative to a panel following installation of the fastener element 20 in a panel. In the disclosed embodiment of the self-riveting male fastener 20, the outer surface of the radial flange portion 26 includes a plurality of equally circumferentially spaced radial teeth 44 each having generally radially extending planars side surfaces 48, a cylindrical end surface 50 and planar surfaces 52 between the radial teeth 44 as best shown in FIGS. 1 and 4. In a preferred embodiment, the planar generally radially extending side surfaces 48 extend generally perpendicular to a circumference "C" of the generally cylindrical radial flange portion 26 providing maximum torque resistance when the radial flange portion 26 is driven into a panel as described below. In the disclosed embodiment, the generally radially extending planar side surfaces 48 of adjacent radial teeth 44 are parallel for ease of manufacture. However, as discussed further below, the radial teeth may have other configurations or other antirotation means may be provided.

Figure 5:
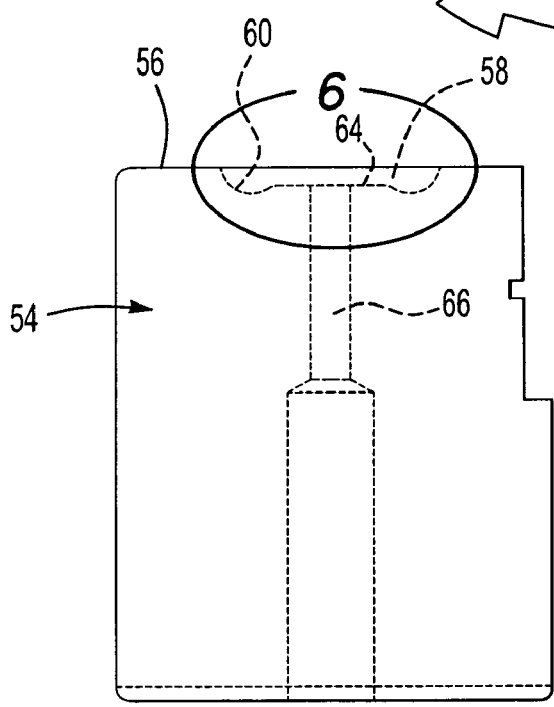
FIG. 5 is a side view of a die button which may be utilized in the installation of the male fastener shown in FIGS. 1 to 4 in a panel.
Figure 6:
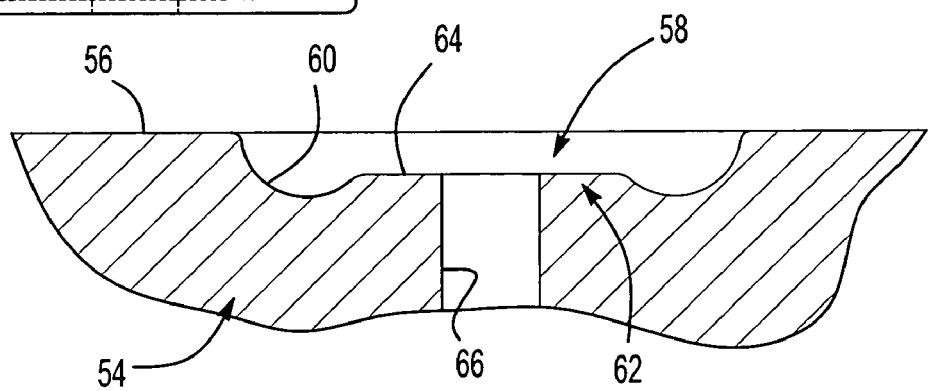
FIG. 6 is a partial side cross-sectioned view of the die button shown in FIG. 5 as indicated by the reference 6 in FIG. 5.
Figure 7:
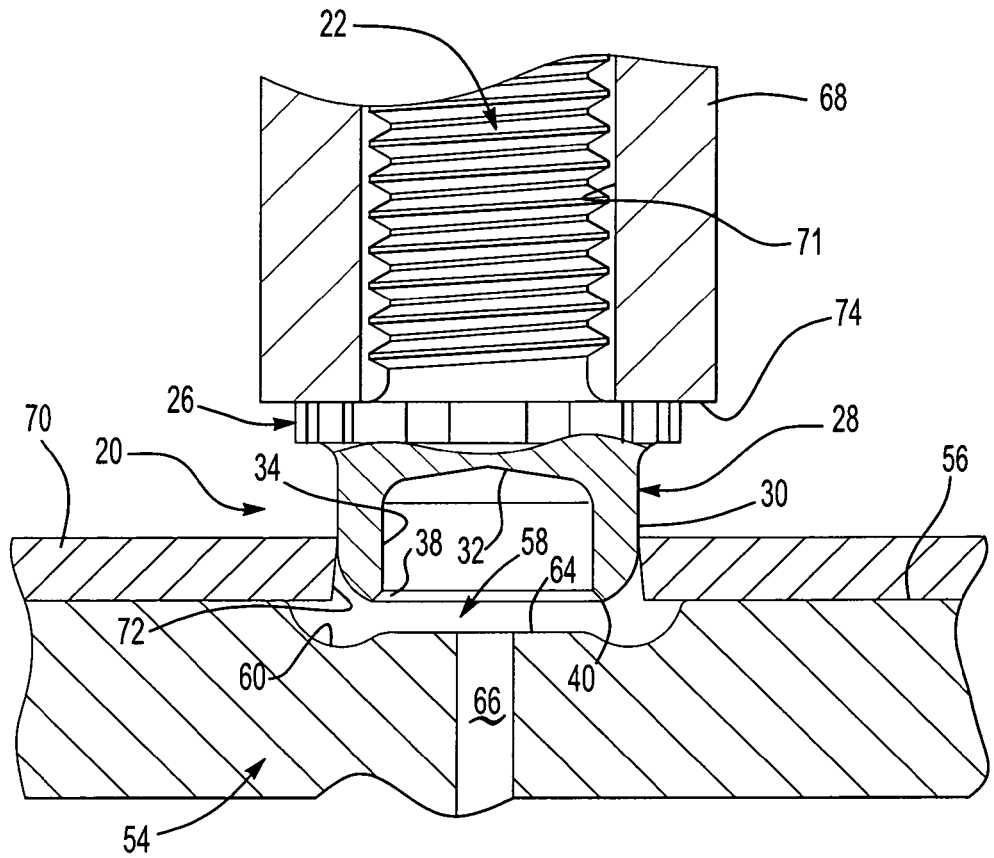
FIG. 7 is a partial cross-sectioned side view of an installation apparatus, including the die button shown in FIGS. 5 and 6 for installing the male fastener shown in FIGS. 1 to 4 in a panel.
Figure 8:
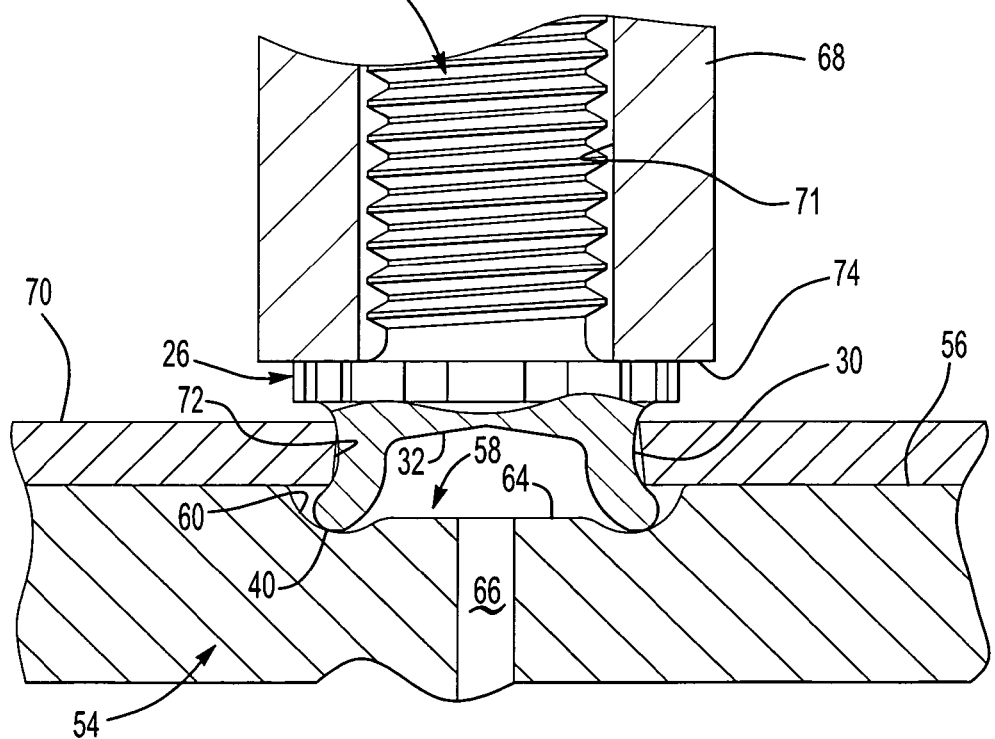
FIG. 8 is a partially cross-sectioned side view of the installation apparatus shown in FIG. 7 during installation of the self-riveting male fastener.
Figure 9:
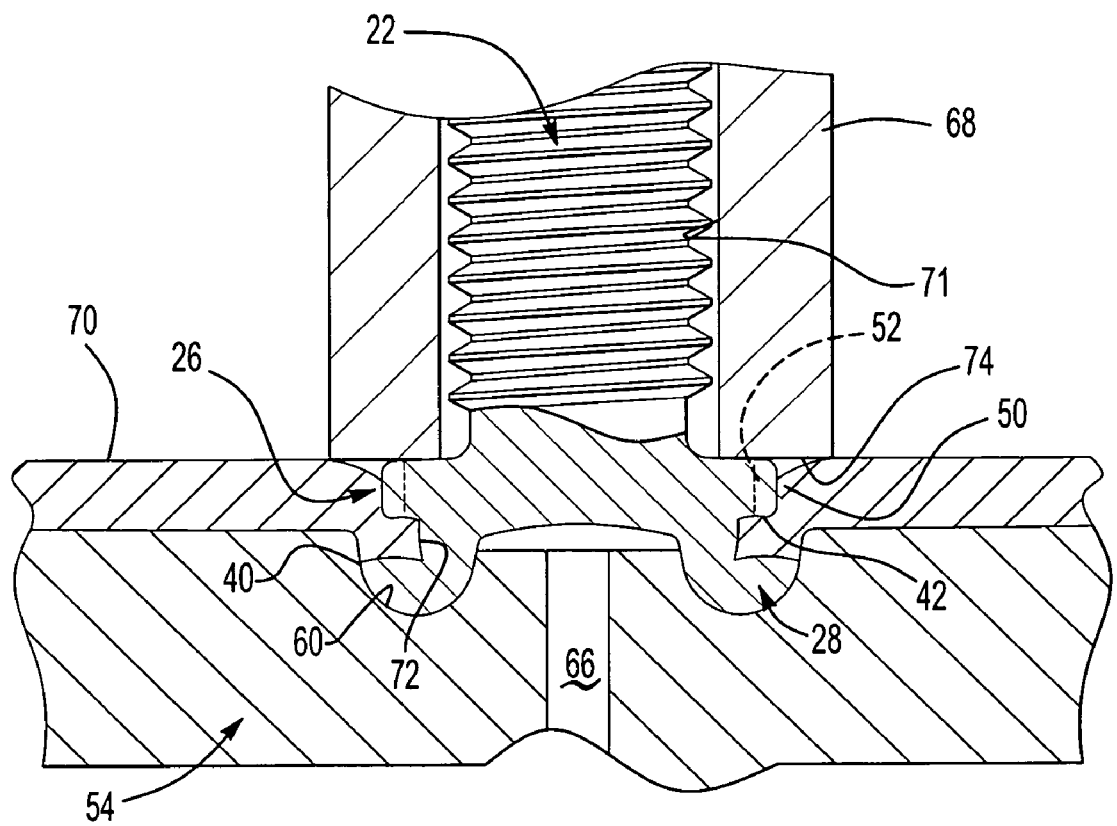
FIG. 9 is a side partially cross-sectioned view of the male fastener and installation apparatus shown in FIGS. 7 and 8 following installation of the male fastener in a panel.

As described above, the self-riveting male fastener 20 may be installed in a panel in a die press (not shown), wherein the lower die shoe or die platen includes a die member or die button 54 as shown in FIGS. 5 and 6 and the upper die member includes an installation head (not shown) having a reciprocating plunger described below with regard to FIGS. 7 to 9. The die button 54 shown in FIGS. 5 and 6 includes a planar panel supporting surface 56 surrounding a die cavity 58 as best shown in FIG. 6. The die cavity 58 includes an annular arcuate concave die surface 60 which extends to adjacent the planar annular outer surface 56 and a central die post 62 preferably having a planar end surface 64 and an axial opening 66 to vent air from the die cavity 58 during installation of the self-riveting male fastener 20 as shown in FIGS. 7 to 9. The annular concave arcuate surface 60 preferably blends with the planar panel-supporting surface with a slight radius, as shown.

As disclosed further in the above referenced U.S. Pat. No. 4,915,558, the upper die shoe or die platen of a die press (not shown) includes an installation head (not shown) which receives the male fastener elements 20 and a reciprocating plunger 68 installs a male fastener in a panel with each stroke of the die press. The plunger 68 includes an axial opening 71 which receives the shank portion 22 of the male fastener element 20 and an annular end face 74 which is driven against the radial flange portion 26 as shown in FIG. 7. The panel 70 is supported on the annular panel supporting surface 56 in the lower guide shoe (not shown) including a panel preformed opening 72 having an internal diameter generally equal to or slightly greater than the diameter of the outer cylindrical surface 34 of the tubular barrel portion 28. The plunger 68 aligns the tubular barrel portion 28 with the panel opening 72 and the panel opening 72 is coaxially aligned with the die cavity 58, such that the chamfered distal end surface 38 is coaxially aligned with an inner surface of the annular arcuate concave die surface 60. The annular end face 74 of the plunger 68 then drives the distal end 40 of the tubular barrel portion 28 through the panel opening 72 as shown in FIG. 7. The plunger 68 then drives the distal end 40 of the tubular barrel portion 28 against the annular arcuate concave die surface 60, deforming the distal end 40 of the tubular barrel portion radially outwardly in the annular arcuate concave die surface 60 as shown in FIG. 8.

Figure 10:
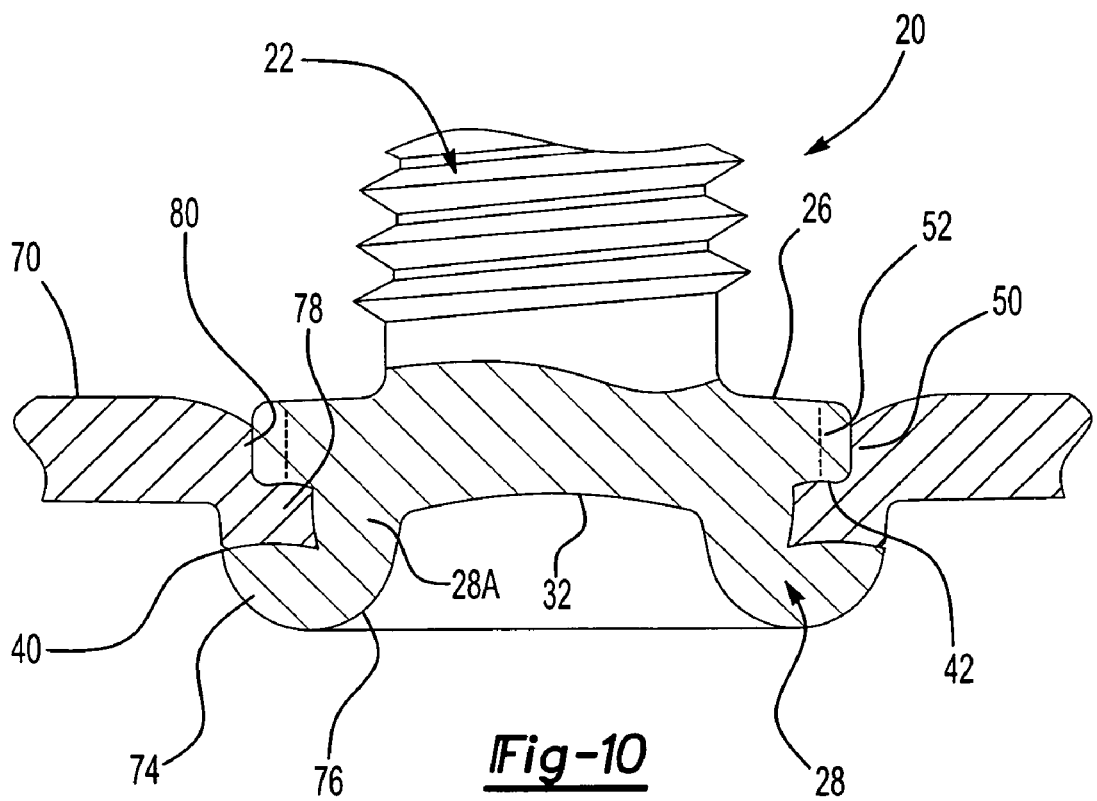
FIG. 10 is a side partially cross-sectioned view of the male fastener and panel assembly of this invention following installation.

FIG. 9 illustrates the final step in forming the self-riveting male fastener and panel assembly and FIG. 10 is an enlarged view of the male fastener and panel assembly. As shown in FIG. 9, the distal end 40 of the tubular barrel portion is deformed radially outwardly into an L-shape, including generally radially outwardly extending portion 74 spaced from the radial flange portion 26 and a tubular portion 28A, including an arcuate surface 76 extending from the distal end 40 to the bottom wall 32 of the barrel portion 28 which smoothly blends with the L-shaped panel portion. As the annular surface 42 of the radial flange portion 26 is driven into the panel portion 70 surrounding the preformed opening 72, a portion of the panel is deformed into the die cavity 58 (see FIG. 6) into an L-shape, including a portion extending perpendicular to the planar panel and a generally radially inwardly directed portion 78 deformed between the generally radially outwardly directed barrel portion 74 and the annular surface 42 of the radial flange portion 76. The L-shaped portion 78 further includes an inner surface 80 which is deformed radially inwardly against the cylindrical outer surface 50 of the radial teeth and against the planar surfaces 52 between the teeth preventing rotation of the self-riveting fastening element 20 and the panel 70. As best shown in FIG. 10, the radially inwardly directed panel portion 78 is deformed between the annular surface 42 of the radial flange 26 and the radially outwardly projecting distal end portion 74, such that the thickness of the radial portion 78 is about one half the thickness of the original panel 70 and the inner panel surface 80 is in substantially full face to face contact with the outer surface of the radial flange portion 26.

Testing of the male fastener and panel assembly shown in FIG. 10 results in a very secure installation and avoids cracking of the barrel 28 even where the self-riveting male fastener element 20 is formed of a high strength carbon steel which has been heat treated to a hardness of 30 Rockwell C or greater, making this installation suitable for high performance applications including, for example, automotive seat restraining studs and safety related applications, such as seat and seat belt retainers, passive restraints and the like. A suitable high strength carbon steel is SAE 1038 carbon steel which is heat treated to Class 10.9, resulting in a hardness of between 30 and 40 Rockwell C. The barrel portion of a conventional 10 mm self-piercing stud as disclosed in U.S. Pat. No. 5,092,724 has an axial length of 11 mm and an outside diameter of 14 mm and an inside diameter of 10.3 mm, with a wall thickness 1.85 mm, such that the volume of the barrel portion is 1,564.9 mm$^3$. However, if the self-piercing stud shown in U.S. Pat. No. 5,092,724 is heat treated to about 30 Rockwell C, the barrel portion will crack if installed as disclosed in this patent. In comparison, the barrel portion of a 10 mm stud as disclosed in this application has an axial length of 6.8 mm, an outside diameter of 12.55 mm and an inside diameter of 8.85 mm, resulting in a volume of 834.8 mm$^3$ and does not result in cracking of the barrel when installed as shown in FIG. 10. Testing indicates that the shank portion 22 will fracture before the stud is either rotated in the panel or pulled out of the panel following installation. The male fastener 20 may also be installed in relatively thick panels, such as steel panels having a thickness of 3.5 mm. Thus, the self-riveting fastening element and panel assembly of this invention may be utilized in high performance applications and solves the problems associated with the prior fastener systems for such applications.

As will be understood by those skilled in this art, various modifications may be made to the self-riveting male fastener 20 and fastener and panel assembly shown in FIG. 10 within the purview of the appended claims. For example, the shank portion 22 may be unthreaded for receipt of a thread-forming female fastener, such as a nut or may have other configurations, including an integral ball for utilization as a ball joint. Further, other antirotation means may be utilized, such as the scalloped configuration shown in U.S. Pat. No. 6,122,816, pockets or projections may also be provided in the surface 42 of the flange portion as is known in this art. However, equally circumferentially spaced radial teeth 44 having generally radially extending planar side surfaces provides superior torque resistance. Having described a preferred embodiment of the self-riveting male fastener and male fastener and panel assembly of this invention, the invention is now claimed as follows.

The invention claimed is:

1. A male self-riveting fastener element for attachment to a panel, comprising:
   a generally cylindrical shank portion;
   a radial flange portion integral and coaxially aligned with said shank portion having a diameter greater than said shank portion;
   a tubular barrel portion integral and coaxially aligned with said radial flange portion having a diameter smaller than said radial flange portion and greater than said shank portion, said tubular barrel portion having a smooth cylindrical outer surface and a free open end, and said radial flange portion having an annular radial surface adjacent to and surrounding said tubular barrel portion;
   said tubular barrel portion having an axial length measured between said annular radial surface of said radial flange portion and said free open end of said tubular barrel portion equal to or less than sixty percent of an outer diameter of said smooth generally cylindrical outer surface of said tubular barrel portion; and
   said male self-riveting fastener formed of a high strength carbon steel having a hardness of greater than 30 Rockwell on the C-scale for high performance applications requiring increased strength and said tubular barrel portion plastically deformable radially outwardly from a longitudinal midportion to rivet said self-riveting fastener to a panel without cracking.

2. The male self-riveting fastener as defined in claim 1, wherein said radial flange portion includes an outer surface having a plurality of circumferentially spaced radial teeth each having a planar substantially radial surface extending generally perpendicular to a circumference of said outer surface of said radial flange portion.

3. The male self-riveting fastener as defined in claim 1, wherein an inner surface and said outer surface of said tubular barrel portion are cylindrical and said tubular barrel portion has a constant cross-section.

4. The male self-riveting fastener as defined in claim 1, wherein said axial length of said tubular barrel portion is about fifty-five percent or less than said outer diameter of said tabular barrel portion.

5. The male self-riveting fastener as defined in claim 1, wherein said self-riveting fastener is formed of a high strength carbon steel having a hardness of between 30 and 40 Rockwell on the C-scale.

6. A self-riveting male fastener and metal panel assembly for high performance applications, comprising;
   a self-riveting male fastener formed of a high strength carbon steel having a hardness of at least 30 Rockwell on the C-scale, including a generally cylindrical shank portion, a radial flange portion integral with said shank portion having a diameter greater than said shank portion including an outer surface, and a tubular barrel portion integral and coaxially aligned with said radial flange portion, said tubular barrel portion including an outer surface having a diameter less than said radial flange portion and greater than said shank portion, and said tubular barrel portion having an axial length prior to installation to, said panel measured between a radial surface of said radial flange portion adjacent to and surrounding said barrel portion and a free open end of said barrel portion of sixty percent or less than a diameter of said barrel portion; and
   a metal panel including a planar portion surrounding said outer surface of said radial flange portion, an L-shaped portion including a first portion integral with said planar portion deformed generally perpendicular to said planar portion against said outer surface of said radial flange portion and a second radially inwardly deformed portion deformed against said outer surface of said tubular barrel portion, and said free open end of said tubular barrel portion deformed radially outwardly against a radial surface of said second radially inwardly deformed portion spaced from said planar portion of said panel without cracking of said barrel portion.

7. The self-riveting male fastener and metal panel assembly as defined in claim 6, wherein said outer surface of said radial flange portion includes a plurality of circumferentially spaced radial ribs each having a planar substantially radial surface and said first portion of said L-shaped panel portion is deformed between said circumferentially spaced radial ribs.

8. The male fastener and metal panel assembly as defined in claim 6, wherein said longitudinal length of said tabular barrel portion prior to installation is equal to or less than fifty-five percent of said outer diameter of said tubular barrel portion.

9. The male fastener and metal panel assembly as defined in claim 6, wherein said self-riveting male fastener is formed of a high strength carbon steel having a hardness of between 30 and 40 Rockwell on the C-scale.

* * * * *

UNITED STATES PATENT AND TRADEMARK OFFICE
CERTIFICATE OF CORRECTION

PATENT NO. : 7,287,944 B2 Page 1 of 1
APPLICATION NO. : 11/335794
DATED : October 30, 2007
INVENTOR(S) : Harold A. Ladouceur It is certified that error appears in the above-identified patent and that said Letters Patent is hereby corrected as shown below:

Column 8, line 42, please delete "tabular" and replace with --tubular--.

Column 10, line 5, please delete "tabular" and replace with --tubular--.

Signed and Sealed this

Sixth Day of May, 2008

JON W. DUDAS
*Director of the United States Patent and Trademark Office*